Dec. 2, 1958 N. L. CULL ET AL 2,862,979
PRODUCTION OF OXO DIMER ALCOHOLS
Filed Jan. 23, 1957
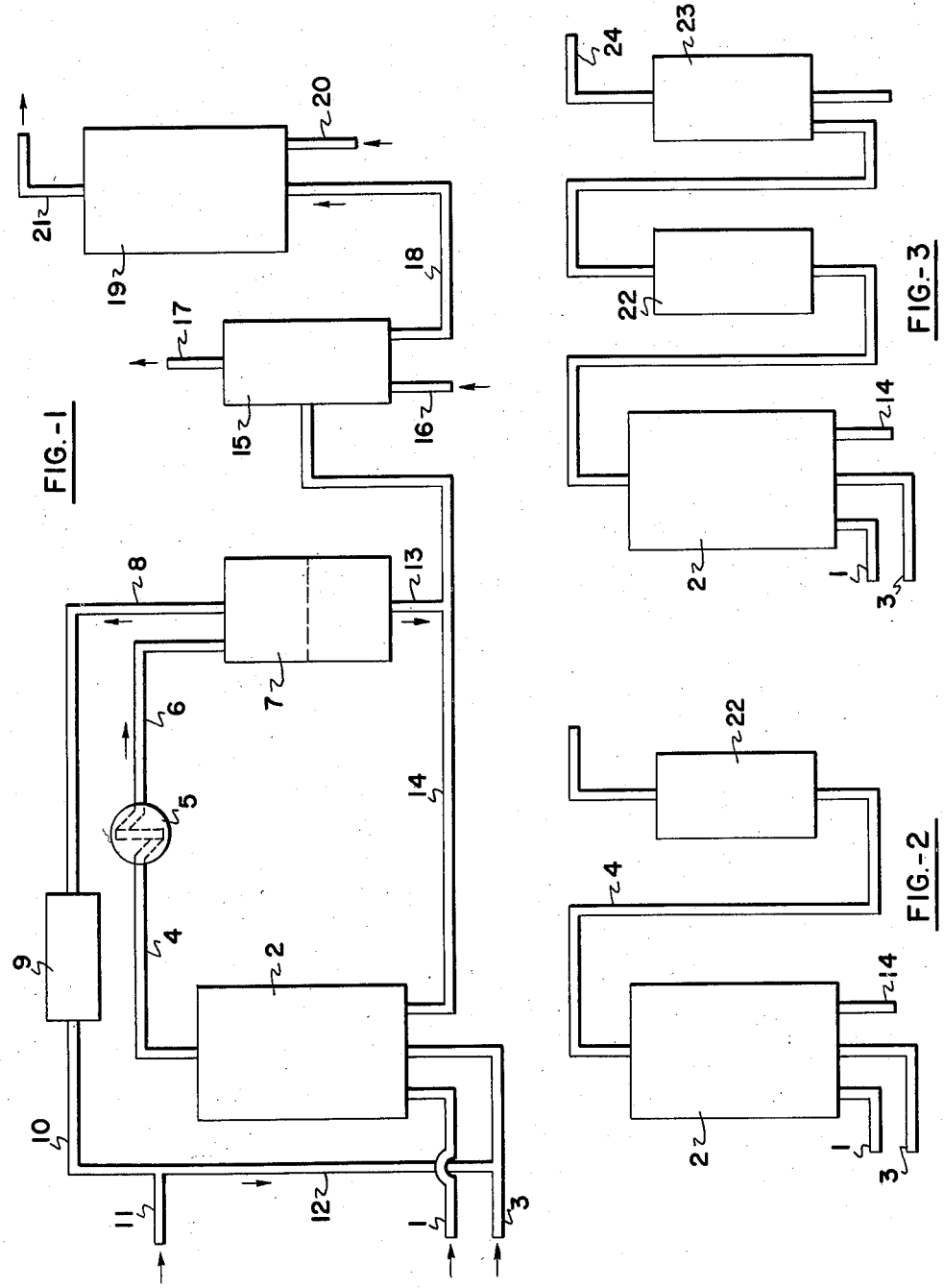
Neville Leverne Cull
Clyde Lee Aldridge   Inventors
By *Seymour Stahl* Attorney

United States Patent Office

2,862,979
Patented Dec. 2, 1958

2,862,979

PRODUCTION OF OXO DIMER ALCOHOLS

Neville Leverne Cull and Clyde Lee Aldridge, Baker, La., assignors to Esso Research and Engineering Company, a corporation of Delaware Application January 23, 1957, Serial No. 635,890

5 Claims. (Cl. 260—638)

This invention relates to a modification of the oxo or carbonylation process whereby the yield of high molecular weight alcohols having 2–3 more carbon atoms than twice the number in the olefin feed and other valuable high molecular weight products is materially increased and the yield of less desirable bottoms is substantially decreased. More particularly, this invention relates to the oxo or carbonylation process employing organic acidic cation exchange resins to effect a desired increase in dimer alcohol yield. The particular manipulative steps of this process will be explained in detail hereinafter.

It is well known in the art that oxygenated organic compounds may be synthesized from organic compounds containing olefinic linkages by a reaction with carbon monoxide and hydrogen in the presence of a catalyst containing materials of group VIII in the periodic chart, such as cobalt, iron, rhodium and the like, in an essentially three-stage process. In the first stage, the olefinic material catalyst and proper proportions of CO and $H_2$ are reacted to give a product consisting predominantly of aldehydes which are converted by hydrogenation to alcohols containing one more carbon atom than the reacted olefin. Secondary products from the above main carbonylation reaction include both dimer alcohols comprising two more carbon atoms than twice the number of carbon atoms in the olefinic feed or containing three more carbon atoms than twice the number of carbon atoms in the olefinic feed. The latter type may be termed more specifically ether or alkoxy alcohols. For example, oxonation of a $C_7$ olefin will after hydrogenation yield $C_8$ alcohols, $C_{16}$ alcohols, $C_{17}$ ether alcohols having an ether linkage near the center of the molecule and higher molecular "bottoms." These dimer alcohols ($C_{16}$ and $C_{17}$) are, in many cases, extremely desirable products and attempts to increase the yields of these compounds have been made with varying degrees of success. Conversely, extremely high molecular weight "bottoms," i. e., the fraction boiling substantially above the so-called dimer oxygenated compounds are undesirable and have generally less utility than the other products.

The oxygenated organic mixture from the first stage which generally contains a form of the catalyst dissolved therein is treated in a second stage to cause removal of soluble metal compounds from the organic material in a catalyst removal zone. The catalyst-free material is then hydrogenated to the corresponding alcohols, or oxidized to the corresponding acids if the aldehydes are not the desired end products. Since today's market finds more utility for alcohols than aldehydes, as for example, intermediates in the preparation of plasticizers, detergents, and the like, most commercial oxo operations include the hydrogenation step. The final alcohol product is then fractionated in a known manner to separate the various fractions noted above.

Amenable to the reaction are long and short chained olefinic compounds, depending on the type alcohol desired. Not only olefins, but most organic compounds, possessing at least one non-aromatic carbon-carbon double bond may be reacted by this method. Thus, straight and branched chain olefins and diolefins, such as propylene, butylene, pentene, hexene, heptene, butadiene, pentadiene, styrene, as well as high molecular weight olefins, such as in the range of $C_8$–$C_{20}$, will find application in the oxo synthesis. It is particularly desirable, for example, to produce $C_{20}$ or $C_{21}$ alcohols from a $C_9$ olefin feed since the feed required in the conventional oxonation of olefins to produce a $C_{20}$ alcohol, i. e. a $C_{19}$ olefin, is less available and more expensive in comparison to the readily available lower molecular weight olefins, i. e. $C_3$–$C_{10}$. Moreover, oxonation of these higher molecular weight olefins requires high temperatures and pressures as well as additional catalyst. Also with U. O. P. $C_{15+}$ olefins oxonation becomes more difficult because of larger amounts of Type IV and V olefinic constituents and very low conversions result.

The catalyst in the first stage is generally added in the form of a salt of the catalytically active metal with a high molecular weight fatty acid, such as stearic, oleic, palmitic, naphthenic, etc. acids. Thus, suitable catalysts are, for example, cobalt oleate, naphthenate, stearate, and the like. These salts are soluble in the liquid olefin feed and may be supplied to the first stage as hydrocarbon solution or dissolved in the olefin feed. Beside the oil-soluble catalyst, water-soluble and insoluble forms of cobalt have been employed with varying degrees of success. The latter type catalysts include cobalt acetate, cobalt formate, cobalt oxalate, cobalt oxide, metallic cobalt, and the like.

The synthesis gas mixture fed to the first stage may consist of almost any ratio of hydrogen to carbon monoxide, i. e. from .5–4:1, preferably in equal volumes. The conditions for reacting olefins with the synthesis gas vary in accordance with the nature of the olefin feed. However, the reaction is generally conducted at pressures in the range of about 1000 to 5000 p. s. i. g. and the temperatures in the range of about 100° to 450° F. It is to be understood that the pressures and temperatures may go beyond the ranges set forth herein and that the specific ranges noted are merely exemplary of the preferred conditions. Ratio of synthesis gas to olefin feed may also vary widely and, in general, may be maintained between 2500 to 15,000 cubic feet of $H_2$+$CO$ per barrel of olefin feed employed.

A typical product distribution from a conventional $C_7$ olefin oxo process comprises about 64 wt. percent $C_8$ alcohol, 3 percent combined $C_{16}$ and $C_{17}$ (dimer) alcohols, 14 wt. percent bottoms and the rest being made up of unreacted hydrocarbons and oxygenated products intermediate the $C_8$ and $C_{16}$ compounds. It is a primary purpose of this invention to increase the dimer alcohol yield. A further object is to concomitantly reduce undesirable bottoms yield in the oxonation process.

To effect the desired results in either a continuous or a batch-type operation several embodiments may be employed, all of which fall within the scope of the invention. This invention comprises contacting the reaction mixture with the cation exchange resin. One embodiment contemplates packing the oxo reactor with the resin so that contact is made during the reaction. The packing may comprise from about 10–100% of the reactor. This embodiment is operative with or without recycling oxygenated product as is done in many commercial operations. Another embodiment entails passing oxo product, i. e. oxo reactor effluent, through a column or any zone containing the cation exchange resin and recycling the contacted product to the oxo reactor. A third embodiment comprises contacting reactor effluent with the resin and then passing the contacted product to a secondary oxo reactor. Conditions within said secondary oxo reactor are preferably within the range of conditions set forth for the primary reactor.

Instead of employing a packed column other methods of contacting can be employed, such as slurrying the resin in olefin feed and passing the slurry into the reactor or slurrying the product effluent with the resin prior to reoxonation. When a slurrying technique is used it will of course be necessary to separate the liquid from the solid which may be done by any conventional means such as filtering, centrifuging and the like.

The present invention and its application will be best understood from a more detailed description hereinafter wherein reference will be made to the accompanying drawing which depicts simplified schematic representations of systems suitable for carrying out several preferred embodiments of this invention. Figure 1 illustrates one embodiment of the invention wherein the oxo reactor is packed with solid contacting material. Figure 2 shows the use of an acidic ion exchange resin packed column through which the oxo reactor effluent passes. Figure 3 shows the use of an additional oxo reactor which may be employed in conjunction with the packed tower in Figure 2.

Referring now to Figure 1, an olefinic hydrocarbon feed such as a $C_7$ olefin containing the desired amount of catalyst, e. g. .05-2 wt. percent cobalt compound, is passed through line 1 to primary oxo reactor 2. Concurrently, a synthesis gas mixture comprising carbon monoxide and hydrogen, preferably in equal ratios is fed into reactor via line 3. Temperatures and pressures are preferably maintained about 350° F. and 3500 p. s. i. g. Tower 2 is packed to the desired extent with the ion exchange resin. The resin may comprise polymeric materials containing active acid radicals such as nuclear sulfonic, methylene sulfonic, carboxylic, phosphoric and the like. There are many ion exchange resins on the market today which are suitable for applicants' purpose and these include, as example, Dowex 30, manufactured by Dow Chemical Company, a phenolic methylene sulfonic acid type; Amberlite IR-120, a strongly acidic sulfonated styrene-divinyl benzene copolymer manufactured by Rohm and Haas Company; and Amberlite IRC-50, a weakly acidic methacrylate-divinyl benzene cross-linked copolymer containing active carboxylic radicals. Both the Amberlite IRC-50 and IR-120 are more specifically and generally disclosed in United States Patents 2,340,110 and 2,340,111 for IRC-50 and 2,366,007 for IR-120, which disclosure for convenience is incorporated herein. Both the weakly and strongly acidic resins are operable; however the weakly acidic resins effect higher total alcohol yield as well as higher dimer alcohol yield.

In general the strongly acid ion exchange resin, e. g. the sulfonic acid type, may be regenerated with an aqueous solution of a strong acid. Typical regeneration treatment would include a wash with 10 volumes of 10% $H_2SO_4$ followed by washes with ethanol (4 vols.), ether (2 vols.), benzene (2 vols.), and petroleum ether (2 vols.). The active ion exchange resin is preferably dried overnight in a vacuum oven at moderate temperatures, e. g. 40° C. Regeneration of the weakly acidic resin is similar. The life of the cation exchange resin may vary considerably depending on all of the conditions including temperature, pressure, feed, and the like, so that no specific time for regeneration will be recited. It will suffice to say, however, that when the dimer alcohol yield drops below any desired amount the resin may be regenerated and reused in the process.

The reactor effluent comprising liquid oxygenated reaction products containing catalyst in solution as well as unreacted synthesis gases is continuously withdrawn overhead via line 4 and passed through cooler 5 via line 6 to a high pressure separator 7 from which unreacted gases are withdrawn overhead via line 8 and passed through scrubber 9 where entrained liquid is separated. The scrubber may be omitted if desired. Synthesis gas may be purged from the system via lines 10 and 11, for convenience the valves are not shown, or alternatively recycled to the reactor via lines 12 and 3. Liquid oxygenated product is recovered from separator 7 via line 13 and any portion thereof may be recycled to the primary oxo reactor via line 14 for cooling the exothermic reaction and for additional conversion of unreacted olefin. The product is passed through line 13 to a decobalter zone 15. Within decobalter 15 soluble cobalt carbonyl is removed from the aldehyde prior to hydrogenation in order to prevent decomposition in the subsequent stages. Decobalting may be accomplished by one of several known means. These include thermal treatment comprising heating coils within decobalter 15 whereby cobalt metal is deposited on the coils. If desired, hydrogen gas may be admitted via line 16 to aid in the decomposition of cobalt carbonyl. Alternatively aqueous decobalting, e. g. with steam and/or water, at elevated temperatures may be employed or acid decobalting may be used, e. g. acetic, oxalic, etc. Carbon monoxide byproduct from the decomposition of cobalt carbonyl and any stripping gas present may be taken overhead via line 17. The decobalted product is then passed via line 18 to hydrogenator 19 and hydrogen gas passed through said zone via line 20. Any of the several known hydrogenation catalysts such as metallic nickel, cobalt and sulfactive catalysts such as the sulfides of molybdenum, zinc, tungsten and the like compounds, may be employed. The novelty of this invention relates primarily to the oxonation stage per se, the hydrogenation step being described merely to set forth a whole process culminating in the recovery of alcohols. Finally, the alcohol product is recovered overhead via line 21. The alcohol product of course may be further purified by distillation or other known means. Fractionating towers are not shown.

In Figure 2, which represents another modification of this invention, zone 22, which may comprise a tower, is placed downstream from the oxo reactor 2 and product effluent is passed through this tower containing solid contact material of the type described, prior to the subsequent stages. In this modification the dimer alcohol product is materially increased regardless of whether the effluent is recycled as shown in Figure 1. The temperature of the reactor effluent and the associated pressures will generally be sufficient to effect the desired chemical change in zone 22; however heating means may be employed to maintain the temperatures and pressures in this zone at 250° to 350° F. and 500 to 3000 p. s. i. g. with residence time of 15 minutes to 12 hours.

In Figure 3, which is another embodiment of this invention, the additional zone 22 containing the solid contact material is also placed downstream from reactor 2, as shown in Figure 2, and a secondary reactor 23 similar to the primary reactor is employed downstream from zone or tower 22. Conditions within secondary reactor 23 are maintained within the ranges set forth for the primary reactor. From the secondary reactor 23 the reactor effluent will be taken overhead via line 24 and fed to the separator 7, all in the manner shown in Figure 1.

To illustrate applicants' invention reference is now had to the following examples:

For the examples shown in the following table a $C_7$ olefin was oxonated under the conditions shown. The hydrogenation in all runs was carried out over a Harshaw nickel catalyst at 350° F. for 6 hours with 3000 p. s. i. g. $H_2$ (methanized). All distillations were carried out at 20 mm. pressure.

Table

[3000 p. s. i. g. H₂/CO (1/1)]

| Run No. | 1 | 2 | 3 | 4 |
|---|---|---|---|---|
| Feed | 1,200 cc. C₇ olefin | | | |
| Catalyst | 2.1 wt. percent Cobalt oleate | | | |
| Modifier, weight percent | None | ¹ 2.4 | ² 2.4 | ¹ 2.4 |
| Temperature, ° F | 350 | 300 | 350 | 350 |
| Time, hours | 6 | 12 | 6 | 6 |
| Distillation data: | | | | |
| Products, weight percent— | | | | |
| Hydrocarbon | 14.7 | 16.1 | 32.8 | 15.9 |
| Intermediate | 4.5 | 3.1 | 6.3 | 3.2 |
| Bottoms | 13.5 | 5.2 | 15.2 | 4.4 |
| C₈ alcohol | 64.5 | 57.8 | 34.1 | 64.1 |
| Dimer alcohols (C₁₆ and C₁₇) | 3.0 | 14.2 | 10.7 | 11.6 |
| Total alcohols | 67.5 | 72.0 | 44.8 | 75.5 |

¹ IRC-50—carboxylic acid type ion exchange resin (Rohm & Haas).
² IR-120—sulfonic acid type ion exchange resin (Rohm & Haas).

The above data clearly show the marked increase in dimer alcohol yield as compared to similar oxonations employing no modifier. Organic cation exchange resins are far superior to other solid contacting agents such as silica-magnesia, kieselguhr, etc.

What is claimed is:

1. A process for producing an alcohol which comprises hydrogenating an aldehyde mixture obtained by carbonylating an olefinic compound with $H_2$ and CO in the presence of a carbonylation catalyst at an elevated temperature and pressure to produce an aldehyde-containing reaction mixture and by contacting said reaction mixture with a modifier comprising an organic weakly acidic cation exchange resin, said modifier being employed in amounts sufficient to produce upon said subsequent hydrogenation increased yields of dimer alcohol.

2. A process in accordance with claim 1 wherein said contacting is accomplished by employing an oxo reactor packed with said cation exchange resin so that contact is made during the reaction.

3. A process in accordance with claim 1 wherein the contacting is carried out by passing the reactor effluent from the oxonation zone through a zone downstream therefrom containing an organic weakly acidic cation exchange resin and recycling the thus contacted product to the oxo reactor.

4. A method in accordance with claim 1 wherein the contacting is carried out by passing the oxo reactor effluent through a zone containing an organic weakly acidic cation exchange resin and then feeding the thus contacted product to a second oxo reactor.

5. A method in accordance with claim 1 wherein said contacting is carried out by feeding to the oxo reactor the olefin feed containing in slurry form active acidic cation exchange resin.

References Cited in the file of this patent

UNITED STATES PATENTS

| 2,479,559 | Dolnick et al. | Aug. 23, 1949 |
| 2,561,254 | Whetstone et al. | July 17, 1951 |
| 2,728,798 | Russum et al. | Dec. 27, 1955 |